3,141,876
3-KETO-6-METHYL-4-PREGNENE-3,20-DIONES AND A METHOD FOR THE PRODUCTION THEREOF

George B. Spero, Kalamazoo Township, Kalamazoo County, Mich., assignor to The Upjohn Company, Kalamazoo, Mich., a corporation of Michigan
No Drawing. Filed Aug. 2, 1956, Ser. No. 601,601
15 Claims. (Cl. 260—239.55)

The present invention relates to steroid compounds and is more particularly concerned with 6-methylcortisone and 6-methylhydrocortisone, the 21-acylates thereof, intermediates in the production thereof and a process for the production therefor.

The present application is a continuation-in-part of application Serial No. 580,142 filed April 23, 1956, now abandoned.

The compounds and the process of the present invention are illustratively represented by the following formulae:

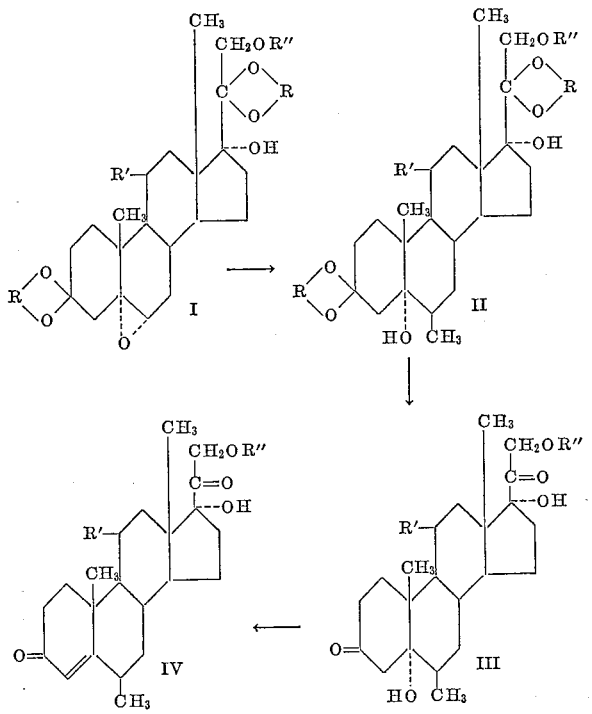

wherein R is an alkylene radical containing not more than eight carbon atoms, inclusive, and the attaching oxygen to carbon bonds are separated by a chain of at least two and not more than three carbon atoms, R' is selected from the group consisting of 11β-hydroxy and 11-keto, and wherein R" is hydroxy or acyloxy, the acyl group being of an organic carboxylic acid preferably a hydrocarbon carboxylic acid containing from one to twelve carbon atoms, inclusive.

The process of the present invention comprises: treating 11-oxygenated-5α,6α-oxido-17α,21-dihydroxyallopregnane-3,20-dione 3,20-bis-(alkylene ketal) (I) with a methyl metal compound, preferably a methyl metal halide and specifically a methyl Grignard reagent to give the corresponding 11-oxygenated-5α,17α,21-trihydroxy-6-methylallopregnane-3,20-dione 3,20-bis-(alkylene ketal) (II); hydrolyzing with acid in a suitable solvent the thus obtained diketal (ii) to yield 11-oxygenated-5α-17α,21-trihydroxy-6-methylallopregnane-3,20-dione (III), and dehydrating the thus obtained 11-oxygenated-5α,17α,21-trihydroxy-6-methylpregnane-3,20-dione (III) with a base or an acid to obtain 11-oxygenated 6-methyl-17α,21-dihydroxy-4-pregnene-3,20-dione (IV). Using in the first step of the reaction other metal halides, dialkyl cadmium compound, alkyl and phenyl cadmium halides, aryl and alkyl calcium halides such as phenyl calcium iodide and especially alkyl and phenyl Grignards such as ethyl, propyl, butyl, phenyl magnesium bromide or iodide results in other 11-oxygenated-5α,17α,21-trihydroxy-6-alkyl- or 6-phenyl-allopregnane-3,20-diones which by the subsequent steps are converted to the corresponding 11-oxygenated 6-alkyl- or 6-phenyl-17α,21-dihydroxy-4-pregnene-3,20-diones.

The term 11-oxygenated here refers to 11β-hydroxy and 11-keto only.

It is an object of the instant invention to provide the 6-methyl analogues of cortisone and hydrocortisone and the 21-esters of these compounds. It is another object of the instant invention to provide a process for the production of 6-methyl analogues of cortisone, hydrocortisone, and the esters thereof as well as other 6-alkyl and 6-phenyl analogues of cortisone and hydrocortisone, and the esters thereof. It is another object of the present invention to provide the intermediates, 11-oxygenated 5α,17α-21-trihydroxy-6-methylallopregnane-3,20-diones, the 3,20-diketals thereof, especially 5α,11β,17α,21-tetrahydroxy-6-methylallopregnane-3,20-dione 3,20-bis-(ethylene ketal) and esters thereof. Other objects of this invention will be apparent to those skilled in the art to which this invention pertains.

The new compounds, 6-methylhydrocortisone, 6-methylcortisone, and the 21-esters thereof, are highly active adrenocortical hormones having glucocorticoid activity in excess of hydrocortisone itself. They have the additional advantage of having low salt retention and in addition have anti-phlogistic activity which makes them valuable for oral and parenteral as well as topical use. In Table I a comparison of the glucocorticoid activity of these compounds with the standard hydrocortisone is shown:

TABLE I
[Ratio of glucocorticoid activity (hydrocortisone=1)]

| Compound: | Glucocorticoid activity (subcutaneous) |
|---|---|
| Hydrocortisone | 1.0 |
| 6-methylhydrocortisone | 4.0 |
| 6-methylhydrocortisone 21-actate | 8.0 |
| Cortisone | 0.6 |
| 6-methylcortisone | 3.3 |

6-methylhydrocortisone is essentially inactive as a mineral corticoid and has a systemic anti-phlogistic activity as measured by granuloma pouch test about three times that of hydrocortisone.

In general the compounds of the present invention can be prepared for animal or human use by incorporating them in any one of several dosage forms suitable for such use. Such a dosage form would include the active ingredients plus a non-toxic carrier which may be either a solid material or a liquid. Bland carriers are of course much preferred for oral use. Examples of oral dosage forms are tablets, capsules, liquid suspensions or solutions. For the dosage forms which are particularly suitable for parenteral administration, a sterile diluent is, of course, necessary. When the active ingredients are to be used topically it can be prepared as an ointment, a bougie, a lotion or a jelly. When the intended use is the eye or ear, the compounds can be prepared in the form of drops or an ointment. The compounds may also be prepared in an aerosol vehicle when the intended use is nasal. Examples of the most preferred dosage forms are as follows:

| | | |
|---|---|---|
| 6-methylhydrocortisone | milligrams | 5 |
| Lactose | grains | 3.3 |
| Sucrose | do | 0.04 |
| Starch | do | 0.075 |
| Calcium stearate | do | 0.02 |

Other dosages of the active ingredient, 6-methylhydrocortisone can be used varying between 1.0 and 25 milligrams. In addition other ingredients may be incorporated in the tablet such as antibiotics, e.g., tetracycline, chlortetracycline, oxytetracycline, chloramphenicol, penicillin, novobiocin, or the like, sulfa drugs, aspirin or vitamins.

An example for tablets for oral use containing aspirin is given below:

50,000 tablets containing aspirin and 6-methylhydrocortisone as the essential active ingredients are prepared from the following types and amounts of ingredients:

Mixture.—Part I:
    Acetylsalicylic Acid Granular USP
        Stand. No. 40 mesh_____ 33 lbs. 1 oz.

Mixture.—Part II:
    6-methylhydrocortisone_____ 386 grs.
    Color_____ 1 lb. 6 oz. 375 grs.
    Bolted starch_____ 11 oz. 188 grs.
    Bolted talc_____ 1 lb. 6 oz. 375 grs.

For topical use, ointments are prepared illustratively as follows:

For the preparation of 500 pounds of an ointment, suitable for topical use, containing advantageously neomycin and 6-methylhydrocortisone as the essential active ingredients, the following types and amounts of ingredients are used:

| | |
|---|---|
| 4% Multiwax No. W-445 * | 20 lbs. |
| 20% Light mineral oil USP viscosity 180 | 100 lbs. |
| 0.5% Cholesterol USP | 2 lbs. 8 oz. |
| 0.02% Methylparaben USP | 1 oz. 263 grs. |
| 0.18% n-Butyl-p-hydroxybenzoate | 14 oz. 175 grs. |
| 0.5% 6-methylhydrocortisone (Micronized) | 2 lbs. 8 oz. |
| 0.6% Neomycin sulfate (Microatomized) | 3 lbs. |
| White petroleum USP q.s.-ad | 500 lbs. |

*A microcrystalline wax of high melting point from L. Sonneborn and Sons, Inc., New York, N.Y.

Other antibiotics which may be used advantageously in place of or with neomycin include polymyxin B sulfate, bacitracin, gramicidin and tyrothricin. Actual potentiation of polymyxin and neomycin is obtained by the addition of 6-methylhydrocortisone.

Instead of 6-methylhydrocortisone, 21-esters thereof, like the 21-acetate, propionate, butyrate, benzoate, phenylacetate, phenylpropionate, dineopentylacetate, tertiary butylacetate, trimethylacetate and other esters, as shown in the examples, may be used for parenteral administration. Furthermore the 6-methylhydrocortisone may be substituted by 6-methylcortisone or 21-esters thereof, such as mentioned before. Other 6-alkylhydrocortisones or 6-alkylcortisones, such as 6-ethyl-, 6-propyl-, 6-butyl-, 6-isobutyl- or 6-phenyl-cortisone and -hydrocortisone can be used in the above compositions. The water soluble esters of polybasic acids and their salts are particularly suitable for parenteral use such as the sodium, phenylephrine, N-methylglucamin salt of 6-methylhydrocortisone 21-hemisuccinate, dimethylglutarate, tartrate, glycolate, or the like, in buffered solution.

The preparation of the above compositions is carried out in conventional manner known in the art.

Similarly the 6-alkyl epi F compound, 6-alkyl-11α,17α,21-trihydroxy-4-pregnene-3,20-dione, may be prepared which has usage as an intermediate in the production of 6-alkylcortisone esters, for example, by the oxidation of 6-alkyl-epi F 21-acylates with chromic acid as shown in Example 20.

The starting material for the instant invention, 5α,6α-oxido - 11 - oxygenated - 17α,21 - dihydroxyallopregnane-3,20-dione 3,20-bis-(ketals), are prepared by ketalization of cortisone, hydrocortisone, and epi F and subsequent treatment with an organic peracid as shown in detail in Preparations 1 through 3.

In carrying out the process of the present invention a 5α,6α - oxido - 11 - oxygenated - 17α,21 - dihydroxyallopregnane-3,20-dione 3,20-bis-(ketal) usually an ethylene ketal, dissolved in a suitable organic solvent, such as tetrahydrofuran, benzene, toluene, ethyl ether, propyl ether, or the like, with the higher boiling solvents such as tetrahydrofuran and benzene preferred, is reacted with a methyl metal compound especially a methyl metal halide such as methyl magnesium chloride, bromide, or iodide, methyl lithium, dimethyl cadmium, or the like. Other useful alkyl or aryl metals and alkyl or aryl metal halides include the ethyl, propyl, butyl, pentyl, hexyl, phenyl, benzyl magnesium chloride, bromide or iodide, the methyl lithium, phenyl lithium, sodium or potassium compound, the phenyl calcium iodide, the alkyl cadmium halides and dialkyl cadmium compounds wherein the alkyl group has from one to six carbon atoms, and the like, with the methyl magnesium bromide and methyl magnesium iodide preferred. In the preferred embodiment of the instant invention the reaction is started at room temperature or below, temperatures between zero and thirty degrees centigrade being preferred. After the addition of the methyl magnesium halide or other methyl metal halides, the temperature is raised and the reaction mixture is heated to about reflux temperature for a period of from one to 48 hours. In general, a large excess of the Grignard reagent (ten to 500 mole equivalents) is used. The temperature for the Grignard addition reaction is generally between 25 to 100 degrees centigrade, with the preferred range of from sixty degrees centigrade to the reflux temperature of the mixture, i.e., about eighty to 85 degrees centigrade.

After the reaction is terminated, the reaction mixture is decomposed using neutral, rather than acidic conditions. In the preferred embodiment of the invention, the reaction mixture is mixed with an aqueous saturated ammonium chloride solution, cooled with ice, and the resulting mixture is stirred for a period of several minutes to one hour. The aqueous and organic layers are then separated from each other. The organic phase is washed, dried and evaporated to give the crude 11-oxygenated-5α,17α,21-trihydroxy-6-methylallopregnane-3,20-dione 3,20 - (alkylene ketal), which can be purified by conventional procedures, such as recrystallization and/or chromatography with organic solvents, as deemed necessary.

The thus obtained 11-oxygenated-5α,17α,21-trihydroxy-6-methylallopregnane-3,20-dione 3,20-bis-(alkylene ketal) is thereupon hydrolyzed in a water-miscible solvent, preferably in an aqueous-alcohol-acidic medium. As solvent alcohols, methanol and ethanol are the preferred alcohols; however, tertiary butyl alcohol, propyl alcohol, isopropyl alcohol, or dioxane, acetone, or the like may be used as solvent. To the solution of the steroid is then added an organic or inorganic acid, preferably a mineral acid such as sulfuric acid, hydrochloric acid; but also organic acids such as formic, acetic, propionic, toluenesulfonic, may be used. The thus obtained mixture is refluxed, then neutralized with sodium bicarbonate, sodium carbonate, potassium carbonate, sodium hydroxide, or other alkali solutions, and concentrated to give a crude product consisting of 11-oxygenated $5\alpha,17\alpha,21$ - trihydroxy-$6\beta$-methylallopregnane-3,20-dione. The crude product can be purified by recrystallization from organic solvents such as acetone, ethyl acetate, Skellysolve B hexanes, methanol, tertiary butyl alcohol, ether, or the like, or mixtures thereof to give pure 11-oxygenated - $5\alpha,17\alpha,21$ - trihydroxy - $6\beta$ - methylallopregnane-3,20-dione.

The thus obtained 11-oxygenated-$5\alpha,17\alpha,21$-trihydroxy-$6\beta$-methylallopregnane-3,20-dione is thereupon dehydrated. Dehydration can be effected in alkali solution or in acidic solution in the absence of presence of a nitrogen atmosphere. In the preferred embodiment of the present invention alkali dehydration is the preferred one. For this purpose the steroid is dissolved in methanol, ethanol, dioxane, or other convenient solvents, unreactive to the base employed, and the solution purged of oxygen by bubbling nitrogen through the solution, and reacted with a similarly oxygen-free alkali metal base solution. Sodium or potassium hydroxide are the preferred bases; however, alkali metal alkoxides, barium hydroxide, calcium hydroxide, or the like, are operative. The alkaline mixture is then allowed to stand in a nitrogen atmosphere for a period of from four to 48 hours at a temperature between fifteen and forty degrees centigrade to give 11-oxygenated-6-methyl-$17\alpha,21$-dihydroxy-4-pregnene-3,20-dione. To isolate this 6-methyl steroid, the mixture is acidified, illustratively with acetic acid and the mixture is thereupon concentrated and finally evaporated to dryness. The resulting residue is recrystallized from suitable organic solvents such as acetone, Skellysolve B-hexanes, heptanes, ethanol, methanol, tertiary butyl alcohol, dioxane, ether, acetone, or the like, to give the pure 11 - oxygenated - 6 - methyl - $17\alpha,21$ - dihydroxy - 4-pregnene-3,20-dione.

Dehydration can also be carried out by reacting the 11 - oxygenated - $5\alpha,17\alpha,21$ - trihydroxy - 6 - methylallopregnane-3,20-dione with an acid, or with thionyl chloride in pyridine solution to give the corresponding 11-oxygenated 6-methyl-$17\alpha,21$-dihydroxy-4-pregnene-3,20-dione.

Instead of the instant steps of (1) decomposing the metal (Grignard) steroid complex in a neutral solution, (2) hydrolyzing to remove the ketal groups and (3) dehydrating to establish a 4(5)-double bond, the metal steroid complex in the original solution may be decomposed, hydrolyzed and dehydrated in one step by the addition of acid, illustratively dilute aqueous sulfuric acid or aqueous alcoholic acid solution. Temperatures between fifteen to forty degrees and a reaction time between six hours to three days depending on the temperatures employed are useful in this one-step procedure to produce 11 - oxygenated 6-methyl - $17\alpha,21$-dihydroxy-4-pregnene-3,20-diones from the corresponding metal complex of 11-oxygenated 6-methyl-$5\alpha,17\alpha,21$-trihydroxy-allopregnane-3,20-dione.

21-acylates of the thus obtained 6-methylcortisone, hydrocortisone and epi-F compounds and other 6-alkyl and 6-aryl cortisone and hydrocortisone compounds are prepared by the same conventional procedures employed for cortisone, hydrocortisone, and epi F, respectively.

The following examples are illustrative of the process and products of the present invention, but are not to be construed as limiting.

PREPARATION 1

$5\alpha,6\alpha$-Oxido-$11\beta,17\alpha,21$-Trihydroxyallopregnane-3,20-Dione 3,20-Bis-(Ethylene Ketal)

To a solution of 0.901 gram of $11\beta,17\alpha,21$-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, was dried over anhydrous sodium sulfate and evaporated to dryness to give 1.031 grams of crude solid. Recrystallization from acetone gave 431 milligrams of product of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and and fifty percent acetone, acetone, and acetone plus five percent methanol. The acetone plus five percent methanol eluate gave an additional 279 milligrams of high melting product. The high melting material, $5\alpha,6\alpha$-oxido-$11\beta,17\alpha,21$-trihydroxyallopregnane-3,20-dione 3,20 - bis-(ethylene ketal) was three times recrystallized from acetone and methanol giving a melting point of 263 to 268 degrees centigrade. Other eluate fractions of lower melting point contained the $5\beta,6\beta$-isomer thereof.

PREPARATION 2

$5\alpha,6\alpha$-Oxido-$11\alpha,17\alpha,21$-Trihydroxyallopregnane-3,20-Dione 3,20-Bis-(Ethylene Ketal)

In exactly the same manner as shown in Preparation 1, $11\alpha,17\alpha,21$-trihydroxy-5-pregnene-3,20 - dione 3,20 - bis-(ethylene ketal) was epoxidized with perbenzoic acid in a chloroform reaction medium to yield a mixture of $5\alpha,6\alpha$-oxido- and $5\beta,6\beta$ - oxido-$11\alpha,17\alpha,21$-trihydroxypregnane-3,20-dione 3,20-bis-(ethylene ketal) which was separated by chromatography so as to isolate the desired $5\alpha,6\alpha$-oxido-$11\alpha,17\alpha,21$-trihydroxyallopregnane-3,20-dione 3,20-bis-(ethylene ketal) from the $5\beta,6\beta$-oxido isomer.

PREPARATION 3

$5\alpha,6\alpha$-Oxido-$17\alpha,21$-Dihydroxyallopregnane-3,11,20-Trione 3,20-Bis-(1,2-Propylene Ketal)

To a solution of one gram of $17\alpha,21$-dihydroxy-5-pregnene-3,11,20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried and evaporated as in Preparation 1. Recrystallization from acetone followed by fractionation of the mother liquor on a column of acid washed alumina, using the technique of Preparation 1 yielded $5\alpha,6\alpha$-oxido-$17\alpha,21$-dihydroxyallopregnane-3,11,20 - trione, 3,20-bis-(1,2-propylene ketal) and the $5\beta,6\beta$-oxido isomer.

Using as starting material the more commonly available cortisone 3,20-bis-(ethylene ketal) gives the $5\alpha,6\alpha$-oxido-$17\alpha,21$-dihydroxyallopregnane-3,11,20-trione 3,20-bis-(ethylene ketal).

In the same manner as shown in Preparations 1 through 3, $5\alpha,6\alpha$-oxido-$11\alpha,17\alpha,21$-trihydroxyallopregnane - 3,20-dione 3,20-bis-(alkylene ketals), $5\alpha,6\alpha$-oxido-$11\beta,17\alpha,21$-trihydroxyallopregnane - 3,20 - dione 3,20-bis-(alkylene ketals) and $5\alpha,6\alpha$-oxido-$17\alpha,21$-dihydroxyallopregnane-3,11-20-trione 3,20-bis-(alkylene ketals) can be prepared by reacting the corresponding cortisone, hydrocortisone, and epi F diketals wherein the ketal group has been formed by reacting the steroid 3,20-dione with ethylene, propylene, 1,2-, 1,3-, or 2,3-butylene glycol or pentane, hexane, heptane, or octane diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention starting compounds having the ethylene ketal groups are preferred, since these ketals are generally more easily prepared than ketals produced by the reaction of the 3,20-diketal compounds with higher alkanediols.

EXAMPLE 1

5α,11β,17α,21-Tetrahydroxy-6-Methylallopregnane-3,20-Dione 3,20-Bis-(Ethylene Ketal)

A solution of 1.115 grams of 5α,6α-oxido-11β,17α,21-trihydroxyallopregnane-3,20-dione 3,20 - bis - (ethylene ketal) in 165 milliliters of tetrahydrofuran (the tetrahydrofuran being purified through distillation over lithium aluminum hydride) was added dropwise to a solution of 95 milliliters of methyl magnesium bromide in ether (the methyl magnesium bromide being of a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts were added to the benzene layer. The combined benzene-ethyl acetate solution was thereupon washed with water, dried over anhydrous sodium sulfate and evaporated to dryness to give 1.314 grams of crude solid. Trituration of this material with ethyl ether left 1.064 grams of crystalline product of melting point 221 to 230 degrees. Recrystallization of this material gave an analytical sample melting at 228 to 233 degrees and rotation [α]$_D$ minus eleven degrees in chloroform of 5α,11β,17α,21-tetrahydroxy-6-methylallopregnane - 3,20-dione 3,20-bis-(ethylene ketal).

Analysis.—Calcd. for $C_{26}H_{42}O_8$: C, 64.70; H, 8.77. Found: C, 64.29; H, 8.69.

EXAMPLE 2

5α,11β,17α,21-Tetrahydroxy-6-Ethylallopregnane-3,20-Dione 3,20-Bis-(Ethylene Ketal)

In the same manner as shown in Example 1, 5α,6α-oxido-11β,17α,21-trihydroxyallopregnane-3,20-dione 3,20-bis-(ethylene ketal), was reacted with ethyl magnesium bromide in ether solution and the thus obtained metal-steroid complex decomposed with aqueous ammonium chloride solution to give the corresponding 5α,11β,17α,21-tetrahydroxy-6-ethylallopregnane - 3,20 - dione 3,20-bis-(ethylene ketal).

EXAMPLE 3

5α,17α,21-Trihydroxy-6-Methylallopregnane-3,11,20-Trione 3,20-Bis-(Ethylene Ketal)

In the same manner as shown in Example 1, 5α,6α-oxido-17α,21-dihydroxyallopregnane-3,11-20-trione 3,20-bis-(ethylene ketal) was reacted with methyl magnesium bromide in benzene solution and the thus obtained metal-steroid complex decomposed with aqueous ammonium chloride solution to give 5α,17α,21-trihydroxy-6-methylallopregnane-3,11,20-trione 3,20-bis-(ethylene ketal).

EXAMPLE 4

5α,11α,17α,21-Tetrahydroxy-6-Methylallopregnane-3,20-Dione 3,20-Bis-(Ethylene Ketal)

In the same manner as shown in Example 1, 5α,6α-oxido-11α,17α,21-trihydroxyallopregnane-3,20-dione 3,20-bis-(ethylene ketal) was reacted with methyl magnesium iodide and the thus obtained metal-steroid complex decomposed with aqueous ammonium chloride solution to give 5α,11α,17α,21 - tetrahydroxy-6-methylallopregnane-3,20-dione 3,20-bis-(ethylene ketal).

EXAMPLE 5

5α,17α,21-Trihydroxy-6-Phenylallopregnane-3,11,20-Trione 3,20-Bis-(Propylene Ketal)

In the same manner as shown in Example 1, a solution of 5α,6α,- oxido - 17α,21 - dihydroxyallopregnane-3,11,20-trione 3,20-bis-(propylene ketal) dissolved in tetrahydrofuran was reacted with a benzene solution of phenyl calcium iodide and the thus obtained metal-steroid complex decomposed with aqueous ammonium chloride solution to give 5α,17α,21-trihydroxy - 6 - phenylallopregnane-3,11,20-trione 3,20-bis-(propylene ketal).

In the same manner as shown in Examples 1 through 5, other 5α,11β,17α,21 - tetrahydroxy-6-alkylallopregnane-3,20-dione 3,20-bis-(ethylene ketal), 5α,11α,17α,21-tetrahydroxy-6-alkylallopregnane - 3,20 - dione 3,20-bis-(ethylene ketal) and 5α,17α,21-trihydroxy - 6 - alkylallopregnane-3,11,20-trione 3,20-bis-(ethylene ketal) are prepared by reacting the corresponding allopregnanes, 5α,6α-oxido-17α,21-dihydroxyallopregnane-3,20-dione 3,20-bis-(ethylene ketal), oxygenated in the 11-position, with a metal alkyl more specifically an alkyl metal halide such as a Grignard reagent, for example, methyl, ethyl, propyl, isopropyl, butyl, pentyl, hexyl, and phenyl magnesium bromides and iodides or similar alkyl cadmium and calcium bromides or iodides. Representative 6-alkylated allopregnanes thus prepared include: 5α,11β,17α,21-tetrahydroxy - 6 - propylallopregnane - 3,20 - dione 3,20-bis-(ethylene ketal), 5α,11β,17α,21-tetrahydroxy-6-butylallopregnane-3,20-dione 3,20-bis-(ethylene ketal), 5α,11β,17α,21 - tetrahydroxy-6-isobutylallopregnane-3,20-dione 3,20-bis-(ethylene ketal), 5α,11β,17α,21-tetrahydroxy-6-pentylallopregnane-3,20-dione 3,20-bis-(ethylene ketal), 5α,11β,17α,21-tetrahydroxy-6-hexylallopregnane-3,20-dione 3,20-bis-(ethylene ketal), 5α,11β,17α,21-tetrahydroxy-6-phenylallopregnane-3,20-dione 3,20-bis-(ethylene ketal); 5α,11α,17α,21-tetrahydroxy-6-ethylallopregnane-3,20-dione 3,20-bis-(ethylene ketal), 5α,11α,17α,21-tetrahydroxy-6-propylallopregnane-3,20-dione 3,20-bis-(ethylene ketal), 5α,11α,17α,21 - tetrahydroxy-6-isopropylallopregnane-3,20-dione 3,20-bis-(ethylene ketal), 5α,11α,17α,21-tetrahydroxy-6-butylallopregnane-3,20-dione 3,20-bis-(ethylene ketal), 5α,11α,17α,21 - tetrahydroxy-6-pentylallopregnane - 3,20-dione 3,20-bis-(ethylene ketal), 5α,11α,17α,21-tetrahydroxy-6-hexylallopregnane-3,20-dione 3,20-bis-(ethylene ketal), 5α,11α,17α,21-tetrahydroxy-6-phenylallopregnane-3,20-dione 3,20-bis-(ethylene ketal), the 11α-monoacylates and 11α,21-diacylates thereof wherein the acyl group is of an organic carboxylic acid and preferably of a hydrocarbon carboxylic acid containing from one to twelve carbon atoms or of a benzenesulfonic acid; 5α,17α,21-trihydroxy-6-ethylallopregnane - 3,11,20 - trione 3,20-bis-(ethylene ketal), 5α,17α,21 - trihydroxy-6-propylallopregnane-3,11,20-trione 3,20-bis-(ethylene ketal), 5α,17α,21-trihydroxy-6-isopropylallopregnane-3,11,20-trione 3,20-bis-(ethylene ketal), 5α,17α,21-trihydroxy-6-butylallopregnane-3,11,20-trione 3,20-bis-(ethylene ketal), 5α,17α,21-trihydroxy-6-pentylallopregnane - 3,11,20 - trione 3,20-bis-(ethylene ketal), 5α,17α,21-trihydroxy-6-hexylallopregnane-3,11,20-trione 3,20-bis-(ethylene ketal), and the like, including those 6-alkylallopregnanes having ketal groups in positions 3 and 20 such as exemplified in the preparations of starting materials.

EXAMPLE 6

5α,11β,17α,21-Tetrahydroxy-6-Methylallopregnane-3,20-Dione

A solution was prepared containing 468 milligrams of 5α,11β,17α,21-tetrahydroxy - 6 - methylallopregnane-3,20-dione 3,20-bis-(ethylene ketal), 38 milliliters of methanol and 7.7 milliliters of 2 Normal sulfuric acid. This solution was refluxed for a period of thirty minutes, then neutralized with dilute sodium bicarbonate solution (about 100 milliliters of five percent solution) and concentrated under reduced pressure at 55 degrees centigrade to about 35 milliliters of volume. A product crystallized upon cooling and was recovered by filtration. This product was recrystallized from acetone-Skellysolve B hexanes to give an analytical pure sample of 5α,11β,17α,21-tetrahydroxy-6-methylallopregnane-3,20-dione of melting point 240 to 244 with decomposition and rotation [α]$_D$ plus forty degrees in dioxane.

Analysis.—Calcd. for $C_{22}H_{34}O_6$: C, 66.98; H, 8.69. Found: C, 66.84; H, 8.86.

EXAMPLE 7

*5α,11β,17α,21-Tetrahydroxy-6-Ethylallopregnane-3,20-Dione*

In the same manner as shown in Example 6, 5α,11β,17α,21-tetrahydroxy-6-ethylallopregnane-3,20-dione 3,20-bis-(ethylene ketal) was hydrolyzed with dilute sulfuric acid in ethanol solution to give 5α,11β,17α,21-tetrahydroxy-6-ethylallopregnane-3,20-dione.

EXAMPLE 8

*5α,17α,21-Trihydroxy-6-Methylallopregnane-3,11,20-Trione*

In the same manner as shown in Example 6, 5α,17α,21-trihydroxy-6-methylallopregnane-3,11,20-trione 3,20-bis-(ethylene ketal) was refluxed in sulfuric acid solution in methanol to yield 5α,17α,21-trihydroxy-6-methylallopregnane-3,11,20-trione.

EXAMPLE 9

*5α,11α,17α,21-Tetrahydroxy-6-Methylallopregnane-3,20-Dione*

In the same manner as shown in Example 6, 5α,11α,17α,21-tetrahydroxy-6-methylallopregnane-3,20-dione 3,20-bis-(ethylene ketal) was hydrolyzed by refluxing the diketal with dilute hydrochloric acid in methanol solution to give 5α,11α,17α,21-tetrahydroxy-6-methylallopregnane-3,20-dione.

EXAMPLE 10

*5α,17α,21-Trihydroxy-6-Phenylallopregnane-3,11,20-Trione*

In the same manner as shown in Example 6, 5α,17α,21-trihydroxy-6-phenylallopregnane-3,11,20-trione 3,20-bis-(propylene ketal) was refluxed with sulfuric acid in methanol solution to give 5α,17α,21-trihydroxy-6-phenylallopregnane-3,11,20-trione.

In the same manner as shown in Examples 6 through 10, inclusive, acid hydrolysis of 5α,11β,17α,21-tetrahydroxy-6-alkylallopregnane-3,20-dione 3,20-bis-(ethylene ketal), 5α,11α,17α,21-tetrahydroxy-6-alkylallopregnane-3,20-dione 3,20-bis-(ethylene ketals), the 21α-monoesters and 11α,21-diesters thereof, and 5α,17α,21-trihydroxy-6-alkylallopregnane-3,11,20-trione 3,20-bis-(ethylene ketal) as well as those 6β-alkylallopregnane-3,20-dione 3,20-bis-(ketals) wherein the ketal group is other than ethylene such as shown in the preparation of starting compounds can be hydrolyzed to give the corresponding 11-oxygenated 5α,17α,21-trihydroxy-6-alkylallopregnane-3,20-diones, such as, for example, 5α,11β,17α,21-tetrahydroxy-6-propylallopregnane-3,20-dione,
5α,11β,17α,21-tetrahydroxy-6-butylallopregnane-3,20-dione,
5α,11β,17α,21-tetrahydroxy-6-isobutylallopregnane-3,20-dione,
5α,11β,17α,21-tetrahydroxy-6-pentylallopregnane-3,20-dione,
5α,11β,17α,21-tetrahydroxy-6-hexylallopregnane-3,20-dione,
5α,11β,17α,21-tetrahydroxy-6-phenylallopregnane-3,20-dione,
5α,11α,17α,21-tetrahydroxy-6-ethylallopregnane-3,20-dione,
5α,11α,17α,21-tetrahydroxy-6-propylallopregnane-3,20-dione,
5α,11α,17α,21-tetrahydroxy-6-isopropylallopregnane-3,20-dione,
5α,11α,17α,21-tetrahydroxy-6-butylallopregnane-3,20-dione,
5α,11α,17α,21-tetrahydroxy-6-pentylallopregnane-3,20-dione,
5α,11α,17α,21-tetrahydroxy-6-hexylallopregnane-3,20-dione,
5α,11α,17α,21-tetrahydroxy-6-phenylallopregnane-3,20-dione, the 21-monoacylates and 11α,21-diacylates thereof wherein the acyl group is of an organic carboxylic acid and preferably of a hydrocarbon carboxylic acid containing from one to twelve carbon atoms, or of a benzenesulfonic acid whenever such esters are stable to acid hydrolysis;

5α,17α,21-trihydroxy-6-ethylallopregnane-3,11,20-trione,
5α,17α,21-trihydroxy-6-propylallopregnane-3,11,20-trione,
5α,17α,21-trihydroxy-6-isopropylallopregnane-3,11,20-trione,
5α,17α,21-trihydroxy-6-butylallopregnane-3,11,20-trione,
5α,17α,21-trihydroxy-6-pentylallopregnane-3,11,20-trione,
5α,17α,21-trihydroxy-6-hexylallopregnane-3,11,20-trione, and the like, including those 6-alkylallopregnanes having ketal groups in positions 3 and 20 as exemplified in the preparations of starting materials.

EXAMPLE 11

*6-Methylhydrocortisone*

A stream of nitrogen was bubbled through a solution of 429 milligrams of 5α,11β,17α,21-tetrahydroxy-6-methylallopregnane-3,20-dione, contained in 100 milliliters of denatured absolute alcohol, for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and was thereupon acidified with acidic acid, and concentrated to dryness under reduced pressure at 55 degrees centigrade. The residue weighing 417 milligrams was recrystallized from acetone-Skellysolve B hexanes to give in two crops 249 milligrams melting between 184 and 194 degrees centigrade. An analytical sample was prepared melting at 203 to 208 degrees centigrade and consisting of pure 6-methylhydrocortisone. Rotation $[\alpha]_D$ plus 110 degrees (in acetone).

Analysis.—Calcd. for $C_{22}H_{32}O_5$: C, 70.18; H, 8.57. Found: C, 70.32; H, 8.50.

$\lambda_{max.}^{ethanol}$ 242–243; $\epsilon = 15,600$

Infrared absorption spectrum in chloroform:

| | |
|---|---|
| 20-keto _____ cm.$^{-1}$__ | 1700 |
| Conjugated 3-keto _____ cm.$^{-1}$__ | 1655 |
| Δ$^4$-double bond _____ | 1600 |

EXAMPLE 12

*6-Ethylhydrocortisone*

In the same manner as shown in Example 11, 5α,11β,17α,21-tetrahydroxy-6-ethylallopregnane-3,20-dione was treated with a solution of potassium hydroxide in methanol to give at room temperature 6-ethylhydrocortisone of melting point 223 to 226 degrees centigrade.

$\lambda_{max.}^{ethanol}$ 244; $\epsilon = 15,800$

Infrared absorption spectrum in Nujol:

| | | |
|---|---|---|
| OH _____ | 3490 | 3420 cm.$^{-1}$ |
| 20-keto group _____ | 1701 | |
| conjugated 3-keto group _____ | | 1636 |
| Δ$^4$-double bond _____ | | 1594 |

EXAMPLE 13

*6-Methyl-11α,17α,21-Trihydroxy-4-Pregnene-3,20-Dione (6-Methyl-11-Epi F)*

In the same manner as shown in Example 11, 5α,11α,17α,21-tetrahydroxy-6-methylallopregnane-3,20-dione was treated with a methanolic solution of potassium hydroxide to give 6-methyl-11α,17α,21-trihydroxy-4-pregnene-3,20-dione (6-methyl epi F).

EXAMPLE 14

6-Methylcortisone

In the same manner as shown in Example 11, 5α,17α,21-trihydroxy-6-methylallopregnane-3,11,20-trione was allowed to stand in a solution of potassium hydroxide in methanol for a period of twenty hours under exclusion of oxygen, that is in a nitrogen atmosphere, to yield 6-methylcortisone of melting point 205 to 208 degrees centigrade.

EXAMPLE 15

6-Phenylcortisone

In the same manner as shown in Example 11, 5α,17α,21-trihydroxy-6-phenylallopregnane - 3,11,20-trione was treated with sodium hydroxide in denatured ethyl alcohol to give 6-phenylcortisone.

In the same manner dehydrating with an alkali hydroxide, alkali alkoxide or a mineral acid in alcoholic solution other 11-oxygenated - 5α,17α,21 - trihydroxy-6-alkylallopregnane-3,20-diones produced the corresponding 11-oxygenated 6-alkyl-17α,21-dihydroxy-4-pregnene-3,20-diones such as 6-propylhydrocortisone, 6-butylhydrocortisone, 6-isobutylhydrocortisone, 6-phenylhydrocortisone, 6-hexylhydrocortisone, 6-phenylhydrocortisone, 6-ethylcortisone, 6-propylcortisone, 6-isopropylcortisone, 6-butylcortisone, 6 - pentylcortisone, 6 - hexylcortisone, 11α,17α,21-trihydroxy-6-ethyl-4-pregnene-3,20 - dione, 11α,17α,21-trihydroxy-6-propyl-4-pregnene-3,20-dione, 11α,17α,21-trihydroxy-6-isopropyl-4-pregnene-3,20-dione, 11α,17α,21-trihydroxy-6-butyl-4-pregnene-3,20-dione, 11α,17α,21-trihydroxy-6-pentyl - 4 - pregnene-3,20-dione, 11α,17α,21-trihydroxy-6-hexyl-4-pregnene - 3,20 - dione, 11α,17α,21-trihydroxy-6-phenyl-4-pregnene-3,20-dione.

EXAMPLE 16

6-Methylhydrocortisone Acetate

A mixture was prepared containing 164 milligrams of 6-methylhydrocortisone in one milliliter of pyridine and one milliliter of acetic anhydride. This mixture was allowed to stand at room temperature (22 to 24 degrees centigrade) for a period of sixteen hours, was thereupon poured into 10 milliliters of ice water and the resulting aqueous mixture was extracted with three 25-milliliter portions of methylene chloride. The combined methylene chloride solutions were washed, dried over anhydrous sodium sulfate and chromatographed over 15 grams of Florisil. The fraction eluted with Skellysolve B plus twenty and thirty percent acetone (92 milligrams) was evaporated and the thus obtained material crystallized three times from acetone-Skellysolve B hexanes to give pure 6-methylhydrocortisone 21-acetate melting at 213 to 214 degrees centigrade.

Analysis.—Calcd. for $C_{24}H_{34}O_6$: C, 68.87; H, 8.19. Found: C, 68.60; H, 8.41.

Infrared absorption spectrum in Nujol mineral oil

| | |
|---|---|
| OH | cm.$^{-1}$ 3440 |
| Acetate carbonyl | cm.$^{-1}$ 1743 |
| 20-keto | cm.$^{-1}$ 1720 |
| Conjugated 3-keto | cm.$^{-1}$ 1654 |
| $\Delta^4$-double bond | cm.$^{-1}$ 1616 |
| Acetate C—O— bond | cm.$^{-1}$ 1234 |

EXAMPLE 17

6-Methylcortisone Benzoate

A mixture of 500 milligrams of 6-methylcortisone, five milliliters of pyridine and five milliliters of benzoyl chloride was allowed to stand at room temperature for a period of eight hours. Thereafter the mixture was poured into excess of water, the water extracts neutralized with sodium bicarbonate and thereupon the mixture refrigerated. The mixture was then filtered and the thus obtained 6-methylcortisone benzoate recrystallized from methanol to give pure 6-methylcortisone benzoate.

EXAMPLE 18

6-Methyl-11α,17α-Dihydroxy-21-Trimethylacetoxy-4-Pregnene-3,20-Dione

A mixture of 500 milligrams of 6-methyl-11α,17α,21-trihydroxy-4-pregnene-3,20-dione in ten milliliters of pyridine was allowed to stand at room temperature for four hours with 0.5 milliliter of trimethylacetyl chloride. Thereafter the mixture was poured into excess of water and extracted with methylene chloride. The methylene extracts were washed with water, dried and evaporated and the thus obtained residue recrystallized from acetone Skellysolve B hexane solutions to give 6-methyl-11α,17α-dihydroxy-21-trimethylacetoxy-4-pregnene-3,20-dione.

EXAMPLE 19

6-Methyl-17α-Hydroxy-11α,21-Diacetoxy-4-Pregnene-3,20-Dione

In the same manner as shown in Example 16, 6-methyl-11α,17α,21-trihydroxy-4-pregnene-3,20-dione was acetylated with acetic anhydride in pyridine solution to give the diester, 6 - methyl-17α-hydroxy-11α,21-diacetoxy-4-pregnene-3,20-dione.

EXAMPLE 20

6-Methylcortisone 21-Trimethylacetate

A mixture containing 6-methyl-11α,17α-dihydroxy-21-trimethylacetoxy-4-pregnene-3,20-dione (200 milligrams), in two milliliters of acetic acid and fifty milligrams of chromic trioxide was allowed to stand at room temperature (about 24 degrees) for a period of three hours. Thereafter one milliliter of ethanol was added, the mixture shaken up and thereupon poured into fifty milliliters of ice water. The aqueous solution was then extracted with three 15-milliliter portions of methylene chloride. The methylene chloride extracts were combined, evaporated, and the residue recrystallized from methanol to give 6-methylcortisone 21-trimethylacetate.

EXAMPLE 21

In the same manner as given in Examples 16 and 17, treating in pyridine solution:

(a) 6-methylhydrocortisone with propionic anhydride yielded 6-methylhydrocortisone 21-propionate.
(b) 6-methylhydrocortisone with butyric anhydride yielded 6-methylhydrocortisone 21-butyrate.
(c) 6-methylhydrocortisone with valeric anhydride yielded 6-methylhydrocortisone 21-valerate.
(d) 6-methylhydrocortisone with hexanoyl bromide yielded 6-methylhydrocortisone 21-hexanoate.
(e) 6-methylhydrocortisone with heptanoyl bromide yielded 6-methylhydrocortisone 21-heptanoate.
(f) 6-methylhydrocortisone with octanoyl chloride yielded 6-methylhydrocortisone 21-octanoate.
(g) 6-methylhydrocortisone with benzoyl chloride yielded 6-methylhydrocortisone 21-benzoate.
(h) 6-methylhydrocortisone with phenylacetyl chloride yielded 6-methylhydrocortisone 21-phenylacetate.
(i) 6-methylhydrocortisone with β-cyclopentylpropionyl bromide yielded 6-methylhydrocortisone 21-(β-cyclopentylpropionate).
(j) 6-ethylhydrocortisone with acetic anhydride yielded 6-ethylhydrocortisone acetate.
(k) 6-propylhydrocortisone with acetic anhydride yielded 6-propylhydrocortisone acetate.
(l) 6-isopropylhydrocortisone with acetic anhydride yielded 6-isopropylhydrocortisone acetate.
(m) 6-butylhydrocortisone with acetic anhydride yielded 6-butylhydrocortisone acetate.
(n) 6-phenylhydrocortisone with acetic anhydride yielded 6-phenylhydrocortisone acetate.
(o) 6-methylcortisone with acetic anhydride yielded 6-methylcortisone 21-acetate.
(p) 6-methylcortisone with propionic anhydride yielded 6-methylcortisone 21-propionate.

(q) 6-methylcortisone with tertiary butyl acetyl chloride yielded 6-methylcortisone 21-tertiary butyl acetate.
(r) 6-methylcortisone with 2-furoyl chloride yielded 6-methylcortisone 21-(2-furoate).
(s) 6-methylcortisone with nicotinyl bromide yielded 6-methylcortisone 21-nicotinate.
(t) 6-phenylcortisone with acetic anhydride yielded 6-phenylcortisone 21-acetate.
(u) 6-ethylcortisone with butyric anhydride yielded 6-ethylcortisone 21-butyrate.
(v) 6-propylcortisone with hexanoyl chloride yielded 6-propylcortisone 21-hexanoate.
(w) 6-isopropylcortisone with benzoyl chloride yielded 6-isopropylcortisone 21-benzoate.
(x) 6-butylcortisone with toluenesulfonyl chloride yielded 6-butylcortisone 21-toluenesulfonate.
(y) 6-pentylcortisone with para-chlorobenzenesulfonyl chloride yielded 6-pentylcortisone 21-para-chlorobenzenesulfonate.
(z) 6-hexylcortisone with cinnamyl chloride yielded 6-hexylcortisone 21-cinnamate.

EXAMPLE 22

In the same manner as shown in Example 18, reacting in pyridine solution (a) 6 - methyl - 11α,17α,21 - trihydroxy-4-pregnene-3,20-dione with triethylacetyl chloride yielded essentially the 6-methyl - 11α,17 - dihydroxy-21-triethylacetoxy-4-pregnene-3,20-dione.
(b) 6 - methyl - 11α,17α,21 - trihydroxy-4-pregnene-3,20-dione with dineopentylacetyl chloride yielded essentially the 6-methyl-11α,17-dihydroxy-21-dineopentylacetoxy-4-pregnene-3,20-dione.
(c) 6-ethyl - 11α,17α,21 - trihydroxy - 4 - pregnene-3,20-dione with trimethylacetyl chloride yielded essentially the 6-methyl-11α,17-dihydroxy-21-trimethylacetoxy-4-pregnene-3,20-dione.
(d) 6 - phenyl - 11α,17α,21 - trihydroxy-4-pregnene-3,20-dione with trimethylacetyl chloride yielded essentially the 6-methyl-11α,17-dihydroxy-21-trimethylacetoxy-4-pregnene-3,20-dione.

The 6-alkyl-11-epi hydrocortisone 21-esters can be oxidized as shown in Example 20, to give the corresponding 6-alkylcortisone 21-esters. Hydrolysis of 6-alkylcortisone 21-ester, dissolved in alcohol, with a base such as sodium or potassium hydroxide or carbonate, preferably in a nitrogen atmosphere, gives the free 6-alkylcortisone.

6-alkylcortisones may also be prepared by oxidation of the corresponding 6-alkylhydrocortisone with a N-haloacidamide or N-haloacidimide, such as shown in Example 23.

EXAMPLE 23

6-Methylcortisone

To 760 milligrams (2.02 millimoles) of 6-methylhydrocortisone (6-methyl-11β,17α,21-trihydroxy-4 - pregnene-3,20-dione) in 32 milliliters of methanol was added 0.67 milliliter of pyridine, 1.34 milliliters of water and 560 milligrams (4.04 millimoles) of N-bromoacetamide. The reaction mixture was held at twelve degrees centigrade overnight when titration of an aliquot indicated that approximately 1.1 mole equivalents of oxidant had been used. At this time sixty milliliters of a dilute solution of sodium sulfite containing 400 milligrams of sodium sulfite) was added to destroy excess N-bromoacetamide and the mixture was concentrated under reduced pressure to about 55 milliliters until copious crystallization occurred. The mixture was cooled to zero degrees centigrade, maintained at this temperature for three hours and filtered to yield 610 milligrams of 6-methylcortisone.

Since the product gave a positive Beilstein test, it was dissolved in 36 milliliters of acetic acid and treated with 1.2 grams of powdered zinc at room temperature for two hours. The mixture was filtered and the filtrate concentrated to ten milliliters under reduced pressure. The addition of fifty milliliters of water caused crystallization. The crystals were filtered off and washed with water and dried to yield 360 milligrams of 6-methylcortisone of melting point 207–207.5. Recrystallization from acetone gave 230 milligrams of melting point 212.5–215 degrees. The infrared absorption spectrum of 6-methylcortisone in Nujol mineral oil is as follows:

| | | |
|---|---|---|
| OH | 3400 | 3305 cm.$^{-1}$ |
| 11- and 20-keto | 1717 | 1700 cm.$^{-1}$ |
| conjugated 3-keto | 1652 | |
| Δ$^4$-double bond | 1604 | |

For intramuscular use or any use where water soluble esters or salts of water soluble esters of 6-methylcortisone or 6-methylhydrocortisone are desired, acid esters such as polybasic acids, illustratively the succinate, hemi-(β,β-dimethylglutarate) or alkali (sodium) salts thereof are prepared as shown in Examples 24 through 27.

EXAMPLE 24

6-Methylhydrocortisone 21-Hemisuccinate

To a stirred solution of 2.5 grams of succinic anhydride in 25 milliliters of pyridine was added 2.0 grams of 6-methylhydrocortisone. Stirring was continued until the 6-methylhydrocortisone was completely dissolved. After standing overnight the reaction mixture was slowly poured into a vigorously stirred mixture of thirty milliliters of concentrated hydrochloric acid, 102 milliliters of water and 127 grams of ice. Stirring was continued for one hour and the crude crystalline, 6-methylhydrocortisone 21-hemisuccinate, was separated by filtration. The product was washed on the filter with water until the filtrate had a pH of 4.0, dried and recrystallized 45 milliliters of methyl ethyl ketone and 36 milliliters of Skellysolve B hexanes to give pure 6-methylhydrocortisone 21-hemisuccinate.

EXAMPLE 25

6-Methylhydrocortisone 21-Hemisuccinate Sodium Salt

Sodium hydroxide solution (0.1 normal) was slowly added to a stirred solution of two grams of 6-methylhydrocortisone 21-hemisuccinate in fifty milliliters of acetone until the pH rose to 7.4. During the addition of NaOH solution, 100 milliliters of water was also added. The solution was concentrated at 25 degrees centigrade under vacuum to remove the acetone. The resulting aqueous solution of 6-methylhydrocortisone 21-hemisuccinate sodium salt was filtered, freeze-dried and recrystallized to give pure 6-methylhydrocortisone 21-hemisuccinate sodium salt.

In the same manner as shown in Examples 24 and 25, the 21-hemisuccinate of 6-methylcortisone and the sodium salt can be prepared.

EXAMPLE 26

6-Methylhydrocortisone 21-(β,β-Dimethylglutarate)

To a solution of 260 milligrams of β,β-dimethylglutaric anhydride in two milliliters of pyridine was added 200 milligrams of 6-methylhydrocortisone. The mixture was stirred until the 6-methylhydrocortisone was completely dissolved and the flask was flushed with nitrogen. The reaction was allowed to stand overnight for eighteen hours and was then slowly poured into a stirred cold solution of 2.4 milliliters of concentrated hydrochloric acid and eighteen milliliters of water. The mixture was extracted with three five-milliliter portions of ethyl acetate, the ethyl acetate layer washed with dilute hydrochloric acid and water, dried over anhydrous magnesium sulfate and concentrated to 1.5 milliliters under reduced pressure. Thereto was added one milliliter of Skellysolve B hexanes and the mixture allowed to cool to zero degrees centigrade.

After 24 hours the mixture was filtered to yield crystals of 6-methylhydrocortisone 21-(β,β-dimethylglutarate). The infrared spectrum of 6-methylhydrocortisone 21-(β,β-dimethylglutarate), measured in Nujol mineral oil, corresponded to the postulated structure of the compound.

In the same manner as shown in Example 26, treating 6-methylcortisone with β,β-dimethylglutaric anhydride yields 6-methylcortisone 21-(β,β-dimethylglutarate).

A metal salt of 6-methylhydrocortisone 21-(β,β-dimethylglutarate) may be prepared as illustrated below:

EXAMPLE 27

*6-Methylhydrocortisone 21-(β,β-Dimethylglutarate) Sodium Salt*

A sodium hydroxide solution (0.1 normal) was slowly added to a stirred solution of two grams of 6-methylhydrocortisone 21-(β,β-dimethylglutarate) in 100 milliliters of acetone until the pH rose to 7.4. During the addition of the sodium hydroxide solution, 100 milliliters of water was also added. The solution was concentrated at 25 degrees centigrade under vacuum to remove the acetone. The resulting aqueous solution was filtered and freeze dried to a give 6-methylhydrocortisone 21-(β,β-dimethylglutarate) sodium salt.

In the same manner given in Example 27, 6-methylcortisone 21-(β,β-dimethylglutarate) sodium salt is prepared by reacting a solution of 6-methylcortisone 21-(β,β-dimethylglutarate) with a solution of sodium hydroxide.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound of the formula:

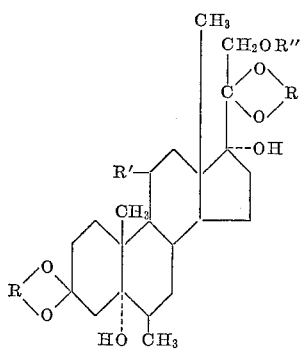

wherein R is an alkylene radical containing not more than eight carbon atoms, inclusive, and the attaching oxygen to carbon bonds are separated by a chain of at least two and not more than three carbon atoms, R' is selected from the group consisting of 11β-hydroxy and 11-keto, and wherein R" is selected from the group consisting of hydroxy and acyloxy, in which the acyl group is of a hydrocarbon carboxylic acid containing from one to twelve carbon atoms, inclusive.

2. 5α,11β,17α,21 - tetrahydroxy - 6 - methylallopregnane-3,20-dione 3,20-bis-(ethylene ketal).

3. A compound of the formula:

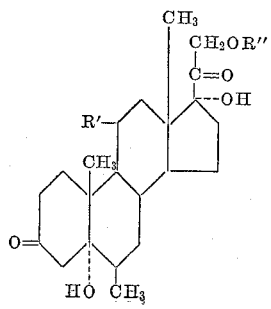

wherein R' is selected from the group consisting of 11β-hydroxy and 11-keto and wherein R" is selected from the group consisting of hydrogen and acyl, in which the acyl group is of a hydrocarbon carboxylic acid containing from one to twelve carbon atoms, inclusive.

4. 5α,11β,17α,21 - tetrahydroxy - 6 - methylallopregnane-3,20-dione.

5. A process for the production of 11-oxygenated 6-methyl-17α,21-dihydroxy-4-pregnene-3,20 - dione which comprises: treating a 5α,6α-oxidoallopregnane-3,20-diketal of the formula:

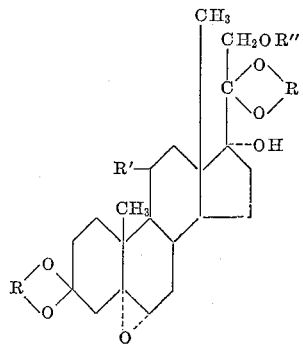

wherein R is an alkylene radical containing not more than eight carbon atoms and the attaching oxygen to carbon bonds are separated by a chain of at least two and not more than three carbon atoms, wherein R' is selected from the group consisting of 11β-hydroxy and 11-keto, wherein R" is selected from the group consisting of hydrogen and acyl, in which the acyl group is of an organic carboxylic acid containing from one to twelve carbon atoms, inclusive, with a methyl magnesium halide, and hydrolyzing the thus produced metal steroid complex in an essentially neutral medium to obtain the corresponding 11-oxygenated-5α,17α,21 - trihydroxy - 6 - methylallopregnane - 3,20-dione 3,20 bis-(alkylene ketal); hydrolyzing with an acid the thus obtained diketal to obtain the corresponding 11-oxygenated 5α,17α,21 - trihydroxy-6-methylallopregnane-3,20-dione and dehydrating with an alkali metal base the thus obtained 6-methylallopregnane compound to obtain the corresponding 11-oxygenated 6-methyl-17α,21-dihydroxy-4-pregnene-3,20-dione.

6. A process for the production of 6-methylhydrocortisone which comprises: treating 5α,6α-oxido-11β,17α,21-trihydroxyallopregnane - 3,20 - dione 3,20 - bis - (alkylene ketal) wherein the alkylene radical contains not more than eight carbon atoms and the attaching oxygen to carbon bonds are separated by a chain of at least two and not more than three carbon atoms, with a methyl magnesium halide, and hydrolyzing the thus produced metal steroid complex in an essentially neutral medium to obtain the corresponding 5α,11β,17α,21-tetrahydroxy-6-methylallopregnane-3,20-dione 3,20-bis-(alkylene ketal); hydrolyzing with a mineral acid the thus obtained diketal to obtain the corresponding 5α,11β,17α,21-tetrahydroxy-6-methylallopregnane-3,20-dione and dehydrating the thus obtained 6-methylallopregnane compound with an alkali metal hydroxide to obtain the corresponding 6-methylhydrocortisone.

7. A process for the production of 6-methylhydrocortisone 21-acylate which comprises: treating 5α,6α-oxido-11β,17α,21-trihydroxyallopregnane - 3,20 - dione 3,20-bis-(alkylene ketal) wherein the alkylene radical contains not more than eight carbon atoms and the attaching oxygen to carbon bonds are separated by a chain of at least two and not more than three carbon atoms, with a methyl magnesium halide, and hydrolyzing the thus produced metal steroid complex in an essentially neutral medium to obtain the corresponding 5α,11β,17α,21-tetrahydroxy-6 - methylallopregnane - 3,20 - dione 3,20 - bis - (alkylene ketal); hydrolyzing with a mineral acid the thus obtained diketal to obtain the corresponding 5α,11β,17α,21-tetrahydroxy-6-methylallopregnane-3,20-dione, dehydrating the thus obtained 6-methylallopregnane compound with an alkali metal hydroxide to obtain the corresponding 6-methylhydrocortisone, and esterifying the thus obtained 6-methylhydrocortisone by an acylating agent selected from the group consisting of anhydrides and acid halides of organic carboxylic acids containing from one to twelve carbon atoms, inclusive, to obtain the corresponding 6-methylhydrocortisone 21-acylate.

8. A process for the production of 6-methylhydrocortisone which comprises: treating 5α,6α-oxido-11β,17α,21-trihydroxyallopregnane - 3,20-dione 3,20-bis-(ethylene ketal) with methyl magnesium halide, and hydrolyzing the thus produced metal steroid complex in an essentially neutral medium to obtain 5α,11β,17α,21-tetrahydroxy-6-methylallopregnane-3,20-dione 3,20-bis-(ethylene ketal); hydrolyzing with a mineral acid the thus obtained diketal to obtain 5α,11β,17α,21-tetrahydroxy-6-methylallopregnane-3,20-dione and dehydrating the thus obtained 6-methylallopregnane compound with an alkali metal hydroxide to obtain 6-methylhydrocortisone.

9. A process for the production of 6-methylhydrocortisone 21-acylate which comprises: treating 5α,6α-oxido-11β,17α,21-trihydroxyallopregnane - 3,20 - dione 3,20-bis (ethylene ketal) with methyl magnesium halide, and hydrolyzing the thus produced metal steroid complex in an essentially neutral medium to obtain 5α,11β,17α,21-tetrahydroxy-6-methylallopregnane-3,20-dione 3,20-bis-(ethylene ketal); hydrolyzing with a mineral acid the thus obtained diketal to obtain 5α,11β,17α,21-tetrahydroxy-6-methylallopregnane-3,20-dione, dehydrating the thus obtained 6-methylallopregnane compound with an alkali metal hydroxide to obtain 6-methylhydrocortisone, and esterifying the thus produced 6-methylhydrocortisone with an acylating agent selected from the group consisting of anhydrides and acyl halides of organic carboxylic acids containing from one to twelve carbon atoms, inclusive, to obtain the corresponding 6-methylhydrocortisone 21-acylate.

10. A process for the production of 6-methylcortisone which comprises: treating 5α,6α-oxido-17α,21-dihydroxyallopregnane - 3,11,20 - trione 3,20-bis-(alkylene ketal) wherein the alkylene radical contains not more than eight carbon atoms and the attaching oxygen to carbon bonds are separated by a chain of at least two and not more than three carbon atoms, and a metal magnesium halide, and hydrolyzing the thus produced metal steroid complex in an essentially neutral medium to obtain the corresponding 5α,17α,21-trihydroxy-6-methylallopregnane - 3,11,20 - trione 3,20-bis-(alkylene ketal); hydrolyzing with a mineral acid the thus obtained diketal to obtain the corresponding 5α,17α,21-trihydroxy-6-methylallopregnane - 3,11,20 - trione and dehydrating the thus obtained 6-methylallopregnane compound with an alkali metal hydroxide to obtain the corresponding 6-methylcortisone.

11. A process for the production of 6-methylcortisone 21-acylate which comprises: treating 5α,6α-oxido-17α,21-dihydroxyallopregnane-3,11,20-trione 3,20 - bis-(alkylene ketal) wherein the alkylene radical contains not more than eight carbon atoms and the attaching oxygen to carbon bonds are separated by a chain of at least two and not more than three carbon atoms, with a methyl magnesium halide, and hydrolyzing the thus produced metal steroid complex in an essentially neutral medium to obtain the corresponding 5α,17α,21 - trihydroxy-6-methylallopregnane-3,11,20-trione 3,20-bis-(alkylene ketal); hydrolyzing with a mineral acid the thus obtained diketal to obtain the corresponding 5α,17α,21-trihydroxy-6-methylallopregnane-3,11,20-trione, dehydrating the thus obtained 6-alkylallopregnane compound with an alkali metal hydroxide to obtain the corresponding 6-methylcortisone, and esterifying the thus produced 6-methylcortisone by an acylating agent selected from the group consisting of anhydride and acid halide of an organic carboxylic acid containing from one to twelve carbon atoms, inclusive, to obtain the corresponding 6-methylcortisone 21-acylate.

12. A process for the production of 6-methylcortisone which comprises: treating 5α,6α-oxido-17α,21-dihydroxyallopregnane-3,11,20-trione 3,20-bis-(ethylene ketal) with methyl magnesium halide and hydrolyzing the thus produced metal steroid complex in an essentially neutral medium to obtain 5α,17α,21-trihydroxy-6-methylallopregnane-3,11,20-trione 3,20-bis-(ethylene ketal); hydrolyzing with a mineral acid the thus obtained diketal to obtain 5α,17α,21-trihydroxy-6-methylallopregnane - 3,11,20 - trione and dehydrating the thus obtained 6-methylallopregnane compound with an alkali metal hydroxide to obtain 6-methylcortisone.

13. A process for the production of 6-methylcortisone 21-acylate which comprises: treating 5α,6α-oxido-17α,21-dihydroxyallopregnane - 3,11,20-trione 3,20-bis-(ethylene ketal) with methyl magnesium halide and hydrolyzing the thus produced metal steroid complex in an essentially neutral medium to obtain 5α,17α,21-trihydroxy-6-methylallopregnane-3,11,20-trione 3,20-bis-(ethylene ketal); hydrolyzing with a mineral acid the thus obtained diketal to obtain 5α,17α,21-trihydroxy-6-methylallopregnane - 3,11,20-trione, dehydrating the thus obtained 6-methylallopregnane compound with an alkali metal hydroxide to obtain 6-methylcortisone, and esterifying the thus produced 6-methylcortisone with an acylating agent selected from the group consisting of anhydride and acid halides of organic carboxylic acids containing from one to twelve carbon atoms, inclusive, to obtain the corresponding 6-methylcortisone 21-acylate.

14. A process which comprises: dehydrating a compound of the formula:

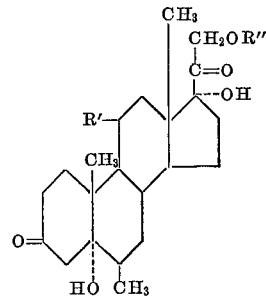

wherein R' is selected from the group consisting of 11β-hydroxy and 11-keto, and wherein R'' is selected from the group consisting of hydrogen and acyl, in which the acyl group is of an organic carboxylic acid containing from one to twelve carbon atoms, inclusive, to obtain the corresponding 11-oxygenated 6-methyl-17α,21-dihydroxy-4-pregnene-3,20-dione.

15. A process for the preparation of a 6-methyl-Δ⁴-3,20-dione steroid compound, which comprises epoxidizing at the 5,6-double bond a 3,20-bisalkylenedioxy-Δ⁵ steroid compound to produce the corresponding 3,20-bisalkylenedioxy-5,6-oxido steroid, reacting said 3,20-bis-alkylenedioxy-5,6-oxido steroid with a methyl magnesium halide to produce the corresponding 3,20-bisalkylenedioxy-5-hydroxy-6-methyl steroid, hydrolyzing said 3,20-bisalkylenedioxy-5-hydroxy-6-methyl steroid to produce the corresponding 5-hydroxy-6-methyl-3,20-dione, and dehydrating said 5-hydroxy-6-methyl-3,20-dione to produce a 6-methyl-Δ⁴-3,20-dione steroid.

References Cited in the file of this patent
UNITED STATES PATENTS

| | | |
|---|---|---|
| 2,700,666 | Bernstein | Jan. 25, 1955 |
| 2,737,518 | Herzog | Mar. 6, 1956 |
| 2,751,379 | Sondheimer | June 19, 1956 |
| 2,751,401 | Hanze et al. | June 19, 1956 |

UNITED STATES PATENT OFFICE

CERTIFICATE OF CORRECTION

Patent No. 3,141,876                                    July 21, 1964

George B. Spero

It is hereby certified that error appears in the above numbered patent requiring correction and that the said Letters Patent should read as corrected below.

Column 3, lines 2 and 3, after "follows:" insert the following:
        Tablets for oral use especially suitable for the treatment of arthristis:

column 11, line 23, for "6-phenylhydrocortisone" read -- 6-pentylhydrocortisone --.

Signed and sealed this 24th day of November 1964.

(SEAL)
Attest:

ERNEST W. SWIDER                              EDWARD J. BRENNER
Attesting Officer                                  Commissioner of Patents